United States Patent [19]

Hansen et al.

[11] Patent Number: 4,960,873
[45] Date of Patent: Oct. 2, 1990

[54] 3-PYRIDYLISOTHIAZOLEAZO COMPOUNDS USEFUL AS DISPERSE DYES

[75] Inventors: Guenter Hansen, Ludwigshafen; Gunther Lamm, Hassloch; Helmut Reichelt, Neustadt; Ernst Schefczik, Ludwigshafen, all of Fed. Rep. of Germany

[73] Assignee: BASF Aktiengesellschaft, Ludwigshafen, Fed. Rep. of Germany

[21] Appl. No.: 320,964

[22] Filed: Mar. 9, 1989

[30] Foreign Application Priority Data

Mar. 29, 1988 [DE] Fed. Rep. of Germany ....... 3810643

[51] Int. Cl.⁵ ................... C09B 29/039; C09B 29/09; C09B 29/36; C09B 29/42; D06P 1/18
[52] U.S. Cl. ...................... 534/765; 534/766; 534/775; 534/573; 534/581; 534/887; 546/280; 546/330; 546/334
[58] Field of Search ............ 534/765, 766, 775

[56] References Cited

U.S. PATENT DOCUMENTS

| | | | |
|---|---|---|---|
| 3,998,802 | 12/1976 | Dehnert et al. | 534/766 |
| 4,006,127 | 2/1977 | Raue et al. | 534/765 X |
| 4,066,637 | 1/1978 | Ramathan | 534/766 X |
| 4,496,480 | 1/1985 | Bergmann et al. | 534/765 X |
| 4,619,992 | 10/1986 | Bergmann et al. | 534/765 X |
| 4,764,600 | 8/1988 | Bergmann et al. | 534/792 |
| 4,774,324 | 9/1988 | Loeffler et al. | 534/766 |

FOREIGN PATENT DOCUMENTS

| | | | |
|---|---|---|---|
| 0151287 | 8/1985 | European Pat. Off. | 534/765 |
| 1909107 | 10/1969 | Fed. Rep. of Germany | 534/765 |
| 3400364 | 7/1985 | Fed. Rep. of Germany | 534/765 |
| 3433958 | 3/1986 | Fed. Rep. of Germany | 534/765 |
| 2151651 | 7/1985 | United Kingdom | 534/765 |

OTHER PUBLICATIONS

Farkas et al. I, Chemical Abstracts, vol. 83, no. 114378y (1975).
Farkas et al. II, Chemical Abstracts, vol. 83, no. 206240a (1975).
Farkas et al. III, Chemical Abstracts, vol. 92, no. 128906s (1980).
Taurins et al., Chemical Abstracts, vol. 74, No. 22749f (1971).
Westphal et al., Chemical Abstracts, vol. 86, no. 89670q (1977).
Wiegand et al., Chemical Abstracts, vol. 76, no. 10353a (1972).

Primary Examiner—Floyd D. Higel
Assistant Examiner—Fiona T. Powers
Attorney, Agent, or Firm—Oblon, Spivak, McClelland, Maier & Neustadt

[57] ABSTRACT

Isothiazoleazo dyes I

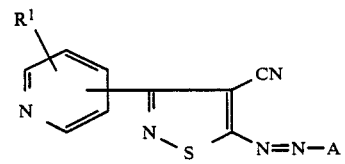

where $R^1$ is H, halogen, $C_1$–$C_4$-alkyl or $C_1$–$C_4$-alkoxy and A is the radical of a coupling component are used predominantly as disperse dyes for dyeing hydrophobic organic fibers and fiber materials.

4 Claims, No Drawings

3-PYRIDYLISOTHIAZOLEAZO COMPOUNDS USEFUL AS DISPERSE DYES

The present invention relates to novel isothiazoleazo dyes of the general formula I

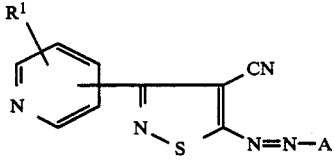

where $R^1$ is hydrogen, halogen, $C_1$-$C_4$-alkyl or $C_1$-$C_4$-alkoxy and A is the radical of a coupling component. The present invention also relates to the preparation of dyes I, the use thereof as disperse dyes, I-containing dye formulations, and the diazo components underlying the dyes I.

DE-A-3,205,435 and DE-A-3,400,364 disclose isothiazoleazo dyes of the type I'

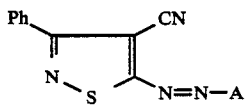

where Ph is substituted or unsubstituted phenyl.

It is an object of the present invention to provide novel dyes having advantageous application properties.

We have found that this object is achieved with the dyes I defined at the beginning.

Particular color strength and very good fastness is possessed by isothiazoleazo dyes of the formula I where the coupling component A is one of the following radicals $A^1$ to $A^5$:

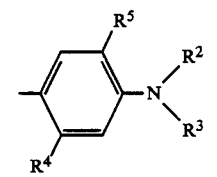

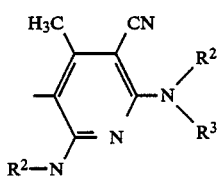

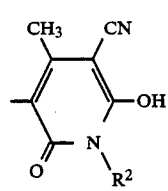

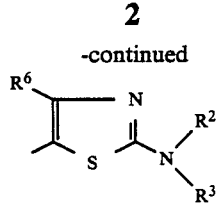

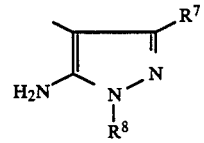

where the substituents are defined as follows:

$R^2$ and $R^3$ are each hydrogen, $C_1$-$C_{12}$-alkyl, which may be interrupted by one or two oxygen atoms and/or may carry one or two substituents from the series consisting of $C_1$-$C_8$-alkoxycarbonyl, whose alkyl chain may be interrupted by one or two oxygen atoms, cyano, hydroxyl, $C_1$-$C_4$-alkanoyloxy, benzoyloxy and phenoxy, $C_3$-$C_5$-alkenyl, $C_5$-$C_7$-cycloalkyl or unsubstituted or chlorine-, methyl-, methoxy-, dimethylamino- or acetylamino-monosubstituted or disubstituted phenyl, is hydrogen, $C_1$-$C_4$-alkyl, $C_1$-$C_4$-alkoxy, chlorine, $C_1$-$C_4$-alkanoylamino, which may be substituted by $C_1$-$C_4$-alkoxy, phenoxy or chlorine, ureido, $C_1$-$C_4$-mono- or -dialkylureido, or $C_1$-$C_4$-alkylsulfonylamino, is hydrogen, $C_1$-$C_4$-alkyl, $C_1$-$C_4$-alkoxy or chlorine, is hydrogen, $C_1$-$C_9$-alkyl, phenyl, furyl, thienyl or pyridyl, the last four of which may carry up to two methyl, methoxy, acetylamino and/or dimethylamino groups and/or chlorine, is hydrogen, $C_1$-$C_4$-alkyl or phenyl, is hydrogen, $C_1$-$C_6$-alkyl, which may be monosubstituted or disubstituted by phenyl, furyl or thienyl, $C_5$-$C_7$-cycloalkyl or phenyl.

$R^1$ in the formula I is for example hydrogen, methyl, ethyl, propyl, butyl, methoxy, ethoxy, fluorine, chlorine or bromine.

Suitable $R^2$ and $R^3$ are each for example hydrogen, methyl, ethyl, propyl, isopropyl, butyl, isobutyl, sec-butyl, pentyl, isopentyl, sec-pentyl, tert-pentyl, hexyl, heptyl, octyl, 2-ethylhexyl, allyl, methallyl, cyclopentyl, methycyclopentyl, cyclohexyl, methylcyclohexyl, cycloheptyl, benzyl, 1- or 2-phenylethyl, 2-hydroxyethyl, 2-cyanoethyl, cyanomethyl, 2-cyanopropyl, 2-hydroxypropyl, 1-methyl-2-hydroxyethyl, 2-hydroxybutyl, 1-ethyl-2-hydroxyethyl, 4-hydroxybutyl, 2-acetoxyethyl, 2-propionoyloxyethyl, 4-acetoxybutyl, 2-acetoxybutyl, 2-propionoyloxybutyl, 2-benzoyloxyethyl, 3-acetoxypropyl, 2-(4-methylbenzoyloxy)ethyl, 2-(3-methylbenzoyloxy)ethyl, 2-benzoyloxypropyl, 2-benzoyloxybutyl, methoxycarbonylmethyl, ethoxycarbonylmethyl, propoxycarbonylmethyl, butoxycarbonylmethyl, 1-methoxycarbonylethyl, 2-methoxycarbonylethyl, 2-ethoxycarbonylethyl, 2-propoxycarbonylethyl, 2-butoxycarbonylethyl, 2-sec-butoxycarbonylethyl, 2-(2-ethylhexyloxycarbonyl)ethyl, 2-(2-methoxyethoxycarbonyl)ethyl, 2-(2-ethoxyethoxycarbonyl)ethyl, 2-(2-butoxyethoxycarbonyl)ethyl, 2-methoxyethyl, 2-ethoxyethyl, 2-propoxyethyl, 2-butoxyethyl, 2-sec-butoxyethyl, 2-phenoxyethyl, 2-(4-acetoxybutoxy)ethyl, 2-methoxypropyl, 2-ethoxypropyl, 2-propoxypropyl, 1-methyl-2-methoxyethyl, 3-methoxypropyl, 3-ethoxypropyl, 3-butoxypropyl, 3-(2-methoxyethoxy)propyl, 3-(5-methoxy-3-oxapentyloxy)propyl, 3-(5-ethoxy-3-oxapentyloxy)propyl, 3-(4-hydroxybutoxy)propyl, 3-(4-acetoxybutoxy)propyl, 6-phenoxy-4-oxahexyl, 2-ethoxy-4-oxahexyl or 3-benzyloxypropyl, 4-chlorophenyl, 2-, 3- or 4-methylphenyl, 2- or 4-methoxyphenyl, 2-ethoxyphenyl or 2,4-dichlorophenyl, 4-dimethylaminophenyl or 4-acetylaminophenyl.

$R^4$ and $R^5$ are each for example hydrogen, chlorine, methyl, ethyl, propyl, isopropyl, butyl, isobutyl, sec-butyl, methoxy, ethoxy, propoxy, isopropoxy, butoxy or sec-butoxy.

Additional examples of $R^4$ are acetylamino, propionylamino, butyrylamino, isobutyrylamino, methoxyacetylamino, ethoxyacetylamino, 2-chloroacetylamino, phenoxyacetylamino, benzoylamino, ureido, methylureido, butylureido, N,N-dimethylureido, methylsulfonylamino, ethylsulfonylamino, propylsulfonylamino and butylsulfonylamino.

Individual radicals $R^6$ are for example hydrogen and also alkyl radicals and substituted phenyl corresponding to the examples for $R^2$.

$R^7$ is hydrogen, alkyl corresponding to the examples for $R^4$ and phenyl.

Suitable $R^8$ is hydrogen, methyl, ethyl, propyl, isopropyl, butyl, isobutyl, sec-butyl, pentyl, isopentyl, sec-pentyl, tert-pentyl, hexyl and $C_5$–$C_7$-cycloalkyl corresponding to the examples for $R^2$.

Preference is given to isothiazoleazo dyes of the formula I where $R^1$ is hydrogen.

Examples of corresponding isothiazoleazo dyes are shown in Tables 1 to 3 below.

TABLE 1

General structure:

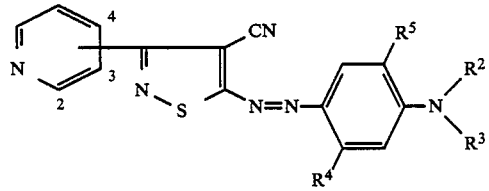

| Example | $x^1$ | $R^2$ | $R^3$ | $R^4$ | $R^5$ |
|---|---|---|---|---|---|
| 1 | 3 | $C_2H_4CN$ | $C_2H_5$ | $CH_3$ | H |
| 2 | 3 | $C_2H_4CO_2CH_3$ | $C_2H_5$ | H | H |
| 3 | 3 | $C_2H_4OH$ | $C_4H_9$ | $CH_3$ | H |
| 4 | 3 | $C_2H_5$ | $C_2H_5$ | $NHCOCH_3$ | H |
| 5 | 3 | $C_2H_4OCOCH_3$ | $C_2H_5$ | $CH_3$ | H |
| 6 | 3 | $C_2H_4OCOCH_3$ | $C_2H_4OCOCH_3$ | H | H |
| 7 | 3 | $C_2H_5$ | $C_2H_5$ | H | H |
| 8 | 3 | $C_2H_4OCH_3$ | $C_2H_4OCH_3$ | H | H |
| 9 | 3 | $C_2H_4OCOCH_3$ | $C_2H_4OCOCH_3$ | $CH_3$ | H |
| 10 | 3 | $C_2H_4C_6H_5$ | $C_2H_4CN$ | H | H |
| 11 | 3 | $C_2H_4OCOC_2H_5$ | $C_2H_4OCOC_2H_5$ | Cl | H |
| 12 | 3 | $C_2H_4OCOC_2H_5$ | $C_2H_4CN$ | H | H |
| 13 | 3 | $C_2H_4CN$ | $CH_2CH=CH_2$ | H | H |
| 14 | 3 | $C_2H_4OCOCH_3$ | $C_2H_4OCOCH_3$ | $CH_3$ | $OCH_3$ |
| 15 | 3 | $CH_2CH=CH_2$ | $CH_2CH=CH_2$ | $NHCOCH_3$ | $OCH_3$ |
| 16 | 3 | $C_2H_4CO_2C_2H_4OC_2H_5$ | $C_2H_5$ | H | H |
| 17 | 4 | $C_2H_4CN$ | $C_2H_5$ | $CH_3$ | H |
| 18 | 4 | $CH_2C_6H_5$ | $C_2H_4CO_2CH_3$ | H | H |
| 19 | 4 | $C_2H_5$ | $C_2H_5$ | H | H |
| 20 | 2 | $C_2H_4CN$ | $C_2H_5$ | H | H |

[1] X = position of pyridyl

TABLE 2

General structure:

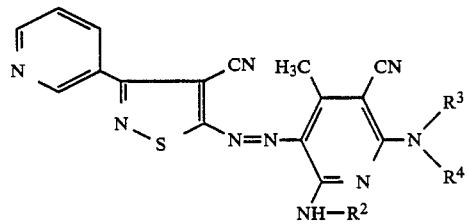

| Example | $R^2$ | $R^3$ | $R^4$ |
|---|---|---|---|
| 1 | H | H | $C_3H_6OC_2H_4OCH_3$ |
| 2 | H | H | $C_3H_6OC_2H_4OC_2H_5$ |
| 3 | H | H | $C_3H_6O(C_2H_4O)_2C_2H_5$ |
| 4 | H | H | $C_3H_6OC_4H_8OCOCH_3$ |
| 5 | $C_3H_6OCH_3$ | $C_2H_4OCH_3$ | $C_2H_4OCH_3$ |
| 6 | CHCH$_2$OCOCH$_3$<br>\|<br>$C_2H_5$ | $C_2H_4OCH_3$ | $C_2H_4OCH_3$ |

TABLE 2-continued

General structure:

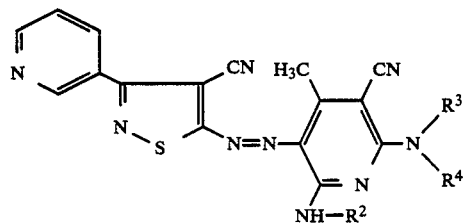

| Example | R² | R³ | R⁴ |
|---|---|---|---|
| 7 | $C_3H_6OCH_3$ | $C_2H_4OCOCH_3$ | $C_2H_5$ |
| 8 | $C_3H_6OC_2H_4OCH_3$ | H | H |
| 9 | $C_3H_6O(C_2H_4O)_2C_2H_5$ | H | H |
| 10 | $C_3H_6O(C_2H_4O)_2C_2H_5$ | $C_3H_6OCH_3$ | H |
| 11 | $C_3H_6O(C_2H_4O)_2CH_3$ | $C_6H_5$ | H |
| 12 | $C_3H_6O(C_2H_4O)_2CH_3$ | (2-methoxyphenyl) | H |
| 13 | $C_2H_5$ | $C_3H_6O(C_2H_4O)_2CH_3$ | H |
| 14 | $C_2H_5$ | $C_3H_6OC_4H_8OH$ | H |
| 15 | $C_2H_4OCH_3$ | $C_3H_6OC_4H_8OH$ | H |
| 16 | $C_3H_6OCH_3$ | $C_3H_6OC_4H_8OH$ | H |
| 17 | $C_3H_6OCOCH_3$ | $C_3H_6OC_2H_4OC_2H_5$ | H |

TABLE 3

General structure:

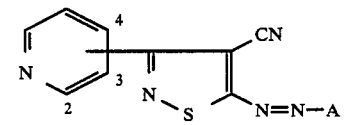

| Examples | X¹ | —A |
|---|---|---|
| 1 | 3 | (phenyl-thiazole-N(C₂H₅)₂) |
| 2 | 3 | (4-methoxyphenyl-thiazole-N(C₂H₅)₂) |
| 3 | 4 | (thienyl-thiazole-N(C₂H₅)₂) |
| 4 | 3 | (5-amino-1-cyclohexylpyrazole) |
| 5 | 3 | (5-amino-1-phenyl-4-methylpyrazole) |
| 6 | 3 | (5-amino-4-methyl-1-furfurylpyrazole) |
| 7 | 4 | (5-amino-3-methyl-4-methyl-1-phenylpyrazole) |

TABLE 3-continued

General structure:

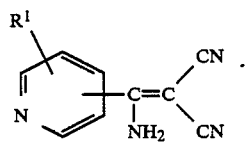

| Examples | X[1] | —A |
|---|---|---|
| 8 | 4 | 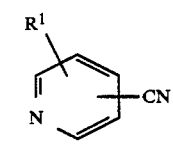 |

[1]X = position of pyridyl

The compounds I according to the invention are obtainable in a conventional manner. More particularly, an amine of the general formula II

II can be diazotized and reacted with a coupling component of the formula HA (III). Suitable coupling components are evident from the examples. These and similar coupling components are common knowledge and described inter alia in the following references: J. M. Straley, in The Chemistry of Synthetic Dyes, Vol. III, ed. K. Venkataraman, Academic Press, N.Y. (1970), H. R. Schwander, Dyes and Pigments 3 (1982), 133-160, BE-A-727,081, O. Annen et al. Rev. Progr. Coloration 17 (1987), 72-85. The amines II are obtainable by the method of earlier Application P 38 04 394.7 by treating a nitrile of the general formula IV

IV in an inert organic diluent with an alcohol of up to 6 carbon atoms, $R^9$-OH, in the presence of hydrogen chloride and reacting the resulting dihydrochloride V

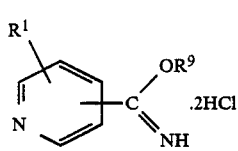

in an inert organic diluent with malodinitrile in the presence of a base to give the 3-amino-2-cyanoacrylonitrile derivative VI

VI and then performing an addition reaction with hydrogen sulfide and oxidative cyclization in a conventional manner.

The diazotization of the weakly basic amines of the general formula II requires high acid concentrations and is preferably carried out in the presence of from 85 to 96% strength by weight sulfuric acid at from 0° to 5° C. A proven reagent is nitrosylsulfuric acid. As for the rest, the subsequent coupling reaction is a standard operation of preparative chemistry, so that no further details are necessary.

The novel compounds of the formula I and mixtures thereof are industrially important for use as dyes for dyeing and printing substrates which are dyeable with disperse dyes.

They are highly suitable in particular for dyeing hydrophobic fiber materials, for example cellulose esters or polyesters, but also polyamides, polyolefins, polyacrylates and polyvinyl compounds. Blend fabrics of polyesters and cellulose fibers are likewise dyeable and printable with them, as are films made of the materials mentioned.

The dyeings obtained have good to very good fastness properties.

Particularly noteworthy of these are the excellent light fastness of the dyes, in particular on polyesters, and their fastness to dry heat setting and pleating, and their brilliance.

Polyester fibers are dyed in a conventional manner by the exhaust method at from about 80° to 125° C. in the presence of carriers or, preferably, under pressure at from about 100° to 140° C. in the absence of carriers.

Furthermore, these fibers can be treated with aqueous dispersions of the compounds or printed with pasty formulations, and the impregnation obtained can be fixed at from about 140° to 230° C., for example by means of steam, contact heat or hot air. It is usual to add dispersants which are preferably anionic or nonionic and can also be used mixed with one another.

EXAMPLE 1

5.05 g (0.025 mol) of 5-amino-4-cyano-3-(3'-pyridyl-)isothiazole were dissolved in 50 ml of glacial acetic acid/propionic acid (volume ratio 3:1) and 10 ml of 85% strength by weight sulfuric acid. 8.2 g of nitrosylsulfuric acid (11.5% by weight of $N_2O_3$) were added dropwise at 0°-5° C. The mixture was then stirred at 0°-5° C. for 4 hours.

A solution of 7.12 g (0.026 mol) of N-β-acetoxyethyl-N-benzylaniline and 50 ml of N,N-dimethylformamide was admixed with 0.5 g of sulfamic acid and 100 g of ice and then in the course of 20 minutes with the diazonium salt solution and also with 300 g of ice.

After the coupling had ended, the dye suspension was filtered, the filtercake was washed neutral with water and dried, leaving 8.5 g of the dye of the formula

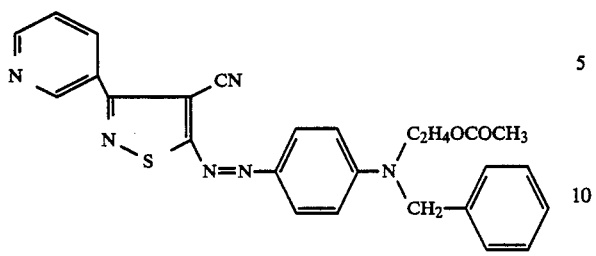

which dyes polyester in bright red shades having very good fastness properties.
Yield: 71% of theory.
mp.: 89°–92° C.
$\lambda^{max}(CH_2Cl_2)$: 525 nm.

EXAMPLE 2

The diazonium salt solution of Example 1 was added in the course of 30 minutes with stirring to a mixture of 5.3 g (0.026 mol) of N-butyl-N-β-cyanoethylaniline, 0.5 g of sulfamic acid and 100 g of ice while the temperature was maintained at 0°–5° C. by addition of a further 200 g of ice. After the coupling had ended, the reaction mixture was worked up in a conventional manner.

9.0 g were obtained of the dye of the formula

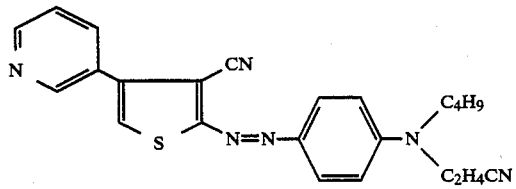

which dyes polyester material in red shades having excellent fastness properties.
Yield: 87% of theory.
$\lambda^{max}(CH_2Cl_2)$: 532 nm.

EXAMPLE 3

8.1 g (0.041 mol) of 5-amino-4-cyano-3-(3'-pyridyl-)isothiazole were dissolved in 70.1 g of 96% strength by weight sulfuric acid and 42.4 g of ice at not higher than 35° C. 13.2 g of nitrosylsulfuric acid were added dropwise at not higher than 5° C., which was followed by stirring at 0°–5° C. for a further 3 hours.

11.3 g (0.047 mol) of 2-N,N-diethylamino-4-(2'-thienyl)thiazole, dissolved in 50 ml of N,N-dimethylformamide, were initially introduced in 300 g of ice and 0.5 g of sulfamic acid and admixed in the course of 10 minutes with the diazonium salt solution at not higher than 5° C. The reaction mixture was worked up in a conventional manner to give 17.3 1 g of the dye of the formula

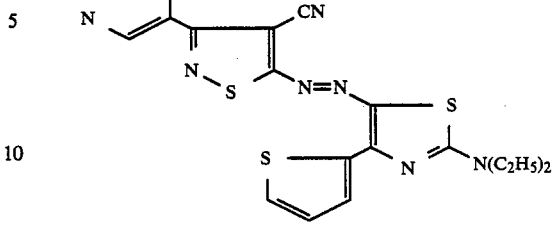

which dyes polyester in fast blue shades.
Yield: 94% of theory.
mp.: 187°–194° C.

EXAMPLE 4

Example 3 was repeated using 7.1 g (0.041 mol) of 5-amino-1-benzylpyrazole as coupling component and obtaining 12.7 g of the dye of the formula

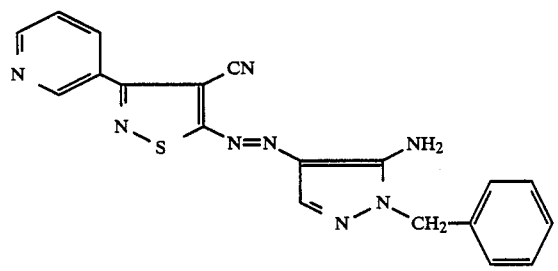

which dyes polyester in golden yellow shades.
Yield: 80% of theory.
mp.: 255°–257° C.

EXAMPLE 5

200 g of gaseous hydrogen chloride were passed at 0°–5° C. into a solution of 208 g of nicotinonitrile and 170 g of 2-chloroethanol in 1 l of chloroform. The mixture was then stirred at 10° C. for 2 hours. The excess hydrogen chloride was then removed under reduced pressure, and the precipitated crystals were filtered off. 492 g were obtained of the dihydrochloride

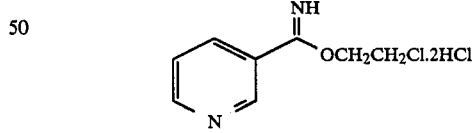

mp.: 238°–240° C.
Analysis: $C_8H_{11}Cl_3N_2O$ (257.5) calc.: Cl 41.4% by weight Cl$^\ominus$ 27.6% by weight. found: Cl 40.7% by weight Cl$^\ominus$ 27.6% by weight.

Thereafter a mixture of 257.5 g of the dihydrochloride obtained and 500 ml of methanol prepared at 5°–10° C. was admixed with 225 g of triethylamine and 66 g of malodinitrile and refluxed for 4 hours. Thereafter the methanol was distilled off with steam, the suspension forming on cooling was filtered, and the filtercake was washed with water and dried.

121 g were obtained of the 3-amino-2-cyanoacrylonitrile derivative

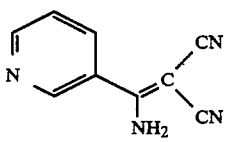

mp.: 216°–217° C. (from ethanol).

Analysis: C₉H₆N₄ (170) calc.: C 63.5% by weight H 3.6% by weight N 32.9% by weight. found: C 63.7% by weight H 3.7% by weight N 33.0% by weight.

110 g of triethylamine and then 40 g of gaseous hydrogen sulfide were introduced into a solution of 170 g of the 3-amino-2-cyanoacrylonitrile derivative in 450 ml of N-methylpyrrolidone. The mixture formed was transferred into 1.2 l of water. The mixture was neutralized with acetic acid, and the resulting precipitate was filtered off and dried. 191 g were obtained of the sulfur-containing compound

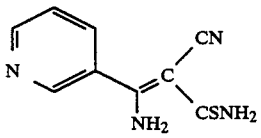

mp.: 185°–186° C. (from pentanol).

A mixture of 1 l of methanol and 204 g of the sulfur-containing compound obtained was put under reflux. 150 g of a 30% strength by weight aqueous hydrogen peroxide solution was then added dropwise in such a way that the reaction mixture was kept refluxing without further heat supply. Refluxing was thereafter maintained for a further hour by external heat supply. The reaction mixture was then diluted with 2 l of water and filtered. 187 g were obtained of the compound

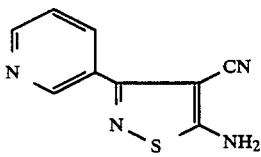

mp.: 218°–219° C. (from ethanol).

Analysis: C₉H₈N₄S (202) calc.: C 53.4% by weight H 3.0% by weight N 27.7% by weight. found: C 53.4% by weight H 3.1% by weight N 27.6% by weight calc.: S 15.8 by weight found: S 15.7% by weight.

We claim:

1. An isothiazoleazo dye of the formula:

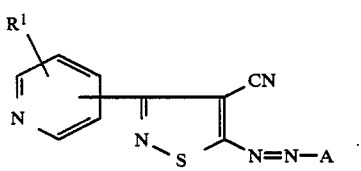

I wherein $R^1$ is hydrogen, halogen, $C_1$–$C_4$-alkyl or $C_1$–$C_4$-alkoxy and A is a member selected from the group consisting of:

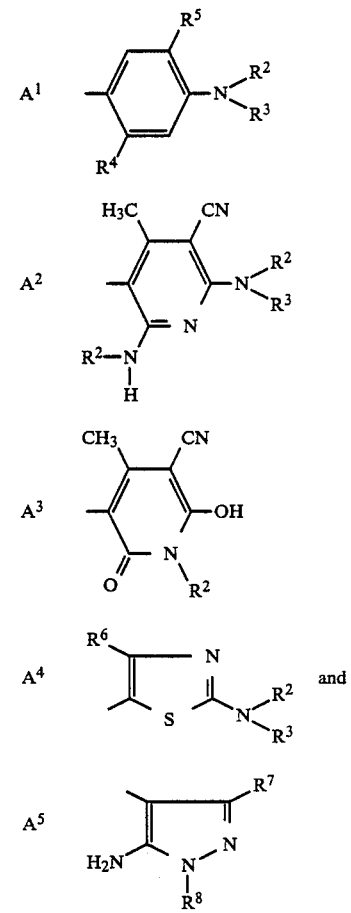

wherein $R^2$ and $R^3$ are each hydrogen; $C_1$–$C_{12}$-alkyl; $C_1$–$C_{12}$-alkyl the chain of which is interrupted by one or two oxygen atoms; said $C_1$–$C_{12}$-alkyl or said $C_1$–$C_{12}$-alkyl interrupted by one or two oxygen atoms carrying one or two substituents selected from the group consisting of cyano, hydroxyl, $C_1$–$C_4$-alkanoyloxy, benzoyloxy, phenoxy, $C_1$–$C_8$-alkoxycarbonyl and $C_1$–$C_8$-alkoxycarbonyl whose alkyl chain is interrupted by one or two oxygen atoms; $C_3$–$C_5$-alkenyl; $C_5$–$C_7$-cycloalkyl; phenyl or phenyl monosubstituted or disubstituted by chlorine, methyl, methoxy, dimethylamino or acetylamino; $R^4$ is hydrogen, $C_1$–$C_4$-alkyl, $C_1$–$C_4$-alkoxy, chlorine, $C_1$–$C_4$-alkanoylamino, $C_1$–$C_4$-alkanoylamino substituted by $C_1$–$C_4$-alkoxy, phenoxy or chlorine, ureido, $C_1$–$C_4$-mono- or dialkylureido or $C_1$–$C_4$-alkylsulfonylamino; $R^5$ is hydrogen, $C_1$–$C_4$-alkyl, $C_1$–$C_4$-alkoxy or chlorine; $R^6$ is hydrogen, $C_1$–$C_9$-alkyl, phenyl, furyl, thienyl, pyridyl, or phenyl, furyl, thienyl or pyridyl each of which is substituted by one or two methyl, methoxy, acetylamino, dimethylamino, or chlorine groups or combinations thereof; $R^7$ is hydrogen, $C_1$–$C_4$-alkyl or phenyl; and $R^8$ is hydrogen, $C_1$–$C_6$-alkyl, $C_1$–$C_6$-alkyl monosubstituted or disubstituted by phenyl, furyl or thienyl; $C_5$–$C_7$-cycloalkyl or phenyl.

2. The isothiazoleazo dye as claimed in claim 1, wherein $R^1$ is hydrogen, methyl, ethyl, propyl, butyl, methoxy, ethoxy, fluorine, chlorine or bromine.

3. The isothiazoleazo dye as claimed in claim 1 where $R^1$ is hydrogen.

4. The isothiazoleazo dye as claimed in claim 1, wherein each of $R^2$ and $R^3$ is hydrogen, methyl, ethyl, propyl, isopropyl, butyl, isobutyl, sec-butyl, pentyl, isopentyl, sec-pentyl, t-pentyl, hexyl, heptyl, octyl, 2-ethylhexyl, allyl, methallyl, cyclopentyl, methylcyclopentyl, cyclohexyl, methylcyclohexyl, cycloheptyl, benzyl, 1- or 2-phenylethyl, 2-hydroxyethyl, 2-cyanoethyl, cyanomethyl, 2-cyanopropyl, 2-hydroxypropyl, 1methyl-2-hydroxyethyl, 2-hydroxybutyl, 1-ethyl-2-hydroxyethyl, 4-hydroxybutyl, 2-acetoxyethyl, 2-propionyloxyethyl, 4-acetoxybutyl, 2-acetoxybutyl, 2-propionyloxybutyl, 2-benzoyloxyethyl, 3-acetoxypropyl, 2-(4-methylbenzoyloxy)ethyl, 2-(3-methylbenzoyloxy)ethyl, 2-benzoyloxypropyl, 2-benzoyloxybutyl, methoxycarbonylmethyl, ethoxycarbonylmethyl, propoxycarbonylmethyl, butoxycarbonylmethyl, 1-methoxycarbonylethyl, 2-methoxycarbonylethyl, 2-ethoxycarbonylethyl, 2-propoxycarbonylethyl, 2-butoxycarbonylethyl, 2-sec-butoxycarbonylethyl, 2-(2-ethylhexyloxycarbonyl)-ethyl, 2-(2-methoxyethoxycarbonyl)ethyl, 2-(2-ethoxyethoxycarbonyl)ethyl, 2-(2-butoxyethoxycarbonyl)ethyl, 2-methoxyethyl, 2-ethoxyethyl, 2-propoxyethyl, 2-butoxyethyl, 2-sec-butoxyethyl, 2-phenoxyethyl, 2-(4-acetoxybutoxy)ethyl, 2-methoxypropyl, 2-ethoxypropyl, 2-propoxypropyl, 1-methyl-2-methoxyethyl, 3-methoxypropyl, 3-ethoxypropyl, 3-butoxypropyl, 3-(2-methoxyethoxy)propyl, 3-(5-methoxy-3-oxapentyloxy)propyl, 3-(5-ethoxy-3-oxapentyloxy)propyl, 3-(4-hydroxybutoxy)propyl, 3-(4-acetoxybutoxy)propyl, 6-phenoxy-4-oxahexyl, 2-ethoxy-4-oxahexyl or 3-benzyloxypropyl, 4-chlorophenyl, 2-, or 3- or 4-methylphenyl, 2- or 4-methoxyphenyl, 2-ethoxyphenyl or 2,4-dichlorophenyl, 4-dimethylaminophenyl or 4-acetylaminophenyl; $R^4$ and $R^5$ are each selected from the group consisting of hydrogen, chlorine, methyl, ethyl, propyl, isopropyl, butyl, isobutyl, sec-butyl, methoxy, ethoxy, propoxy, isopropoxy, butoxy, sec-butoxy, and group $R^4$ is further selected from the group consisting of acetylamino propionylamino, butyrylamino, isobutyrylamino, methoxyacetylamino, ethoxyacetylamino, 2-chloroacetylamino, phenoxyacetylamino, benzoylamino, ureido, methylureido, butylureido, N,N-dimethylureido, methylsulfonylamino, ethylsulfonylamino, propylsulfonylamino or butylsulfonylamino; $R^6$ is hydrogen or one of the alkyl substituted phenyl radicals of substituent $R^2$; $R^7$ is hydrogen, phenyl, methyl, ethyl, propyl, isopropyl, butyl, isobutyl or sec-butyl; and $R^8$ is hydrogen, methyl, ethyl, propyl, isopropyl, butyl, isobutyl, sec-butyl, pentyl, isopentyl, sec-pentyl, t-pentyl, hexyl, cyclopentyl, methylcyclopentyl, cyclohexyl, methylcyclohexyl or cycloheptyl.

* * * * *